United States Patent
Schanz et al.

[11] Patent Number: 5,937,817
[45] Date of Patent: Aug. 17, 1999

[54] DRY SUMP OIL COOLING SYSTEM

[75] Inventors: John W. Schanz, Mequon; Bruce M. Roberts, Brown Deer; Gary L. Lockwitz, Cedarburg; Paul J. Troxler, Brookfield, all of Wis.

[73] Assignee: Harley-Davidson Motor Company, Milwaukee, Wis.

[21] Appl. No.: 09/103,001

[22] Filed: Jun. 23, 1998

[51] Int. Cl.⁶ ..................................................... F01M 1/10
[52] U.S. Cl. ............................. 123/196 AB; 123/195 C; 123/196 R; 123/198 E; 184/106; 184/6.5
[58] Field of Search ........................ 123/196 AB, 196 R, 123/195 C, 198 E; 184/106, 6.5

[56] References Cited

U.S. PATENT DOCUMENTS

| | | | |
|---|---|---|---|
| 2,577,188 | 12/1951 | Hall | 184/106 |
| 3,301,230 | 1/1967 | Ito | 123/8 |
| 5,038,890 | 8/1991 | Tanaka et al. | 184/6.5 |
| 5,103,782 | 4/1992 | Matsui | 123/195 C |
| 5,465,692 | 11/1995 | Uraki et al. | 123/195 C |

*Primary Examiner*—Noah P. Kamen
*Assistant Examiner*—Brian Hairston
*Attorney, Agent, or Firm*—Michael Best & Friedrich LLP

[57] ABSTRACT

A dry sump oil cooling system for an internal combustion engine includes an oil pan reservoir, an oil return port, an oil pickup port, and a baffle. The oil pan reservoir has a first end, a second end, a length therebetween, a top and a bottom. Both the oil return port and the oil pickup port are defined at the first end of the reservoir. The oil return port is located adjacent the top of the reservoir while the oil pickup port is located adjacent the bottom of the reservoir. The baffle is coupled to the reservoir between the top and the bottom or free-standing within the reservoir to divide the reservoir into a top chamber and a bottom chamber. The baffle at least partially defines an oil passageway between the top chamber and the bottom chamber at the second end such that most of the oil flows substantially across the length of the oil pan reservoir twice before being returned to the engine by the oil pickup port.

24 Claims, 5 Drawing Sheets

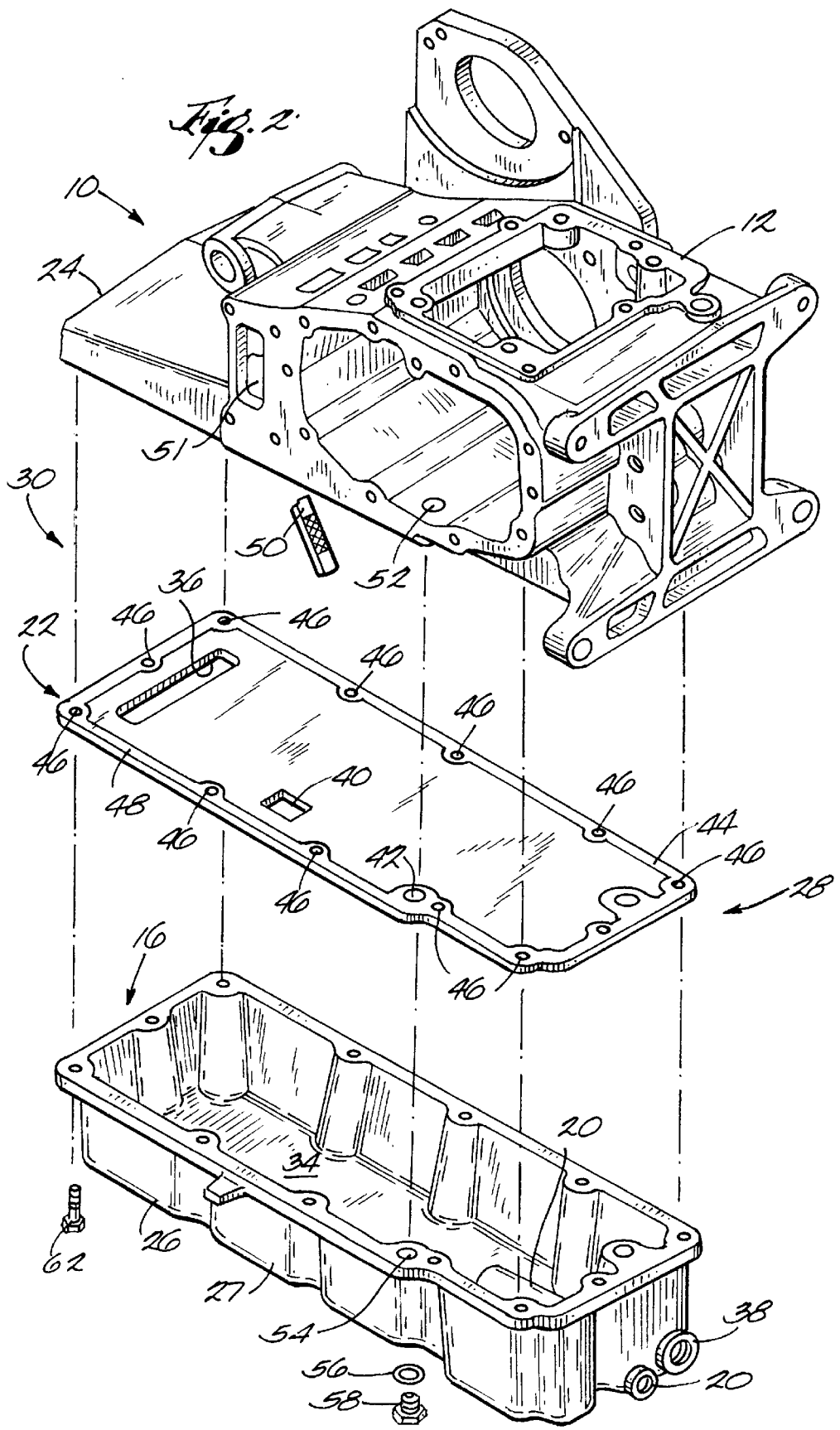

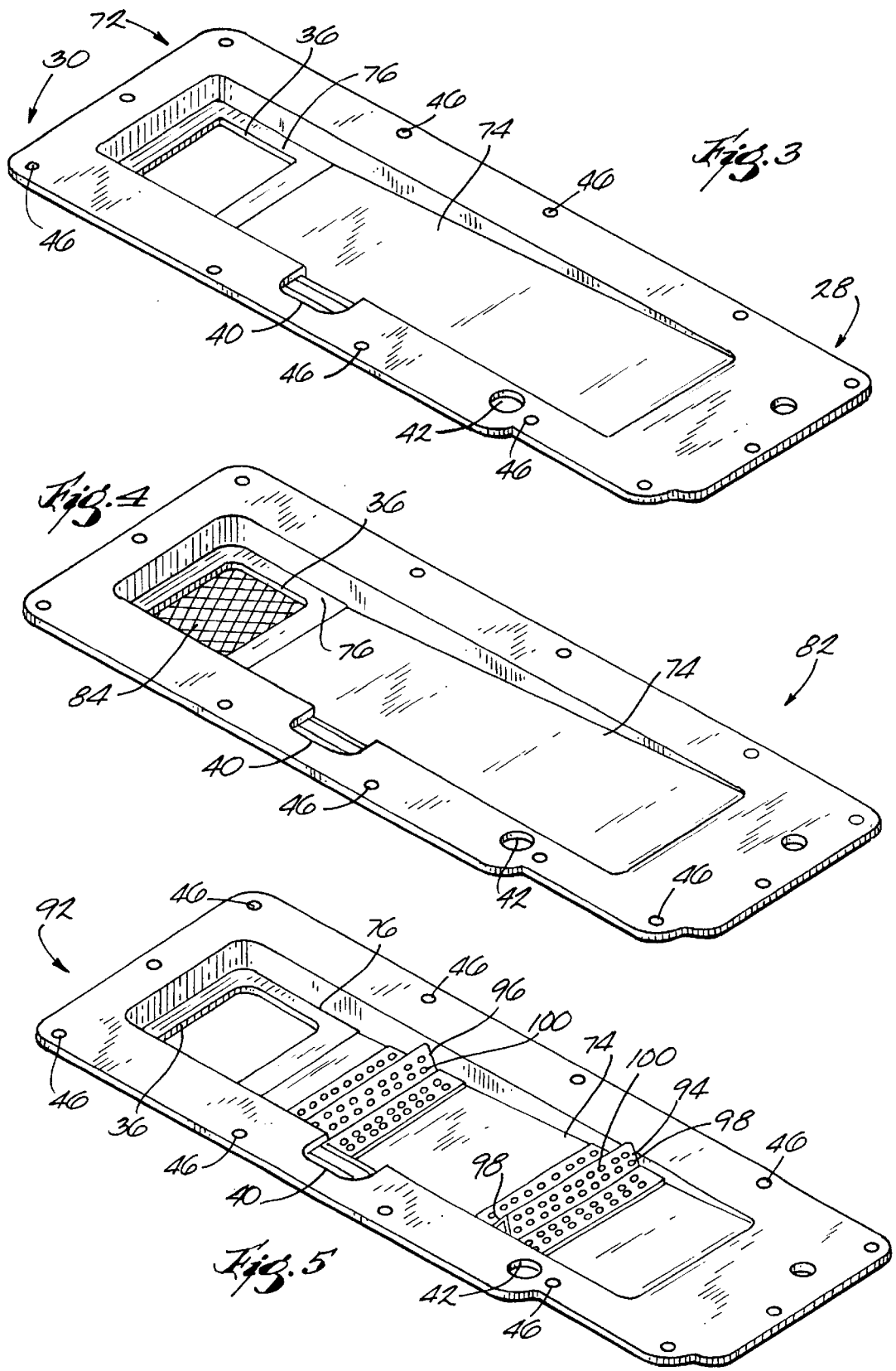

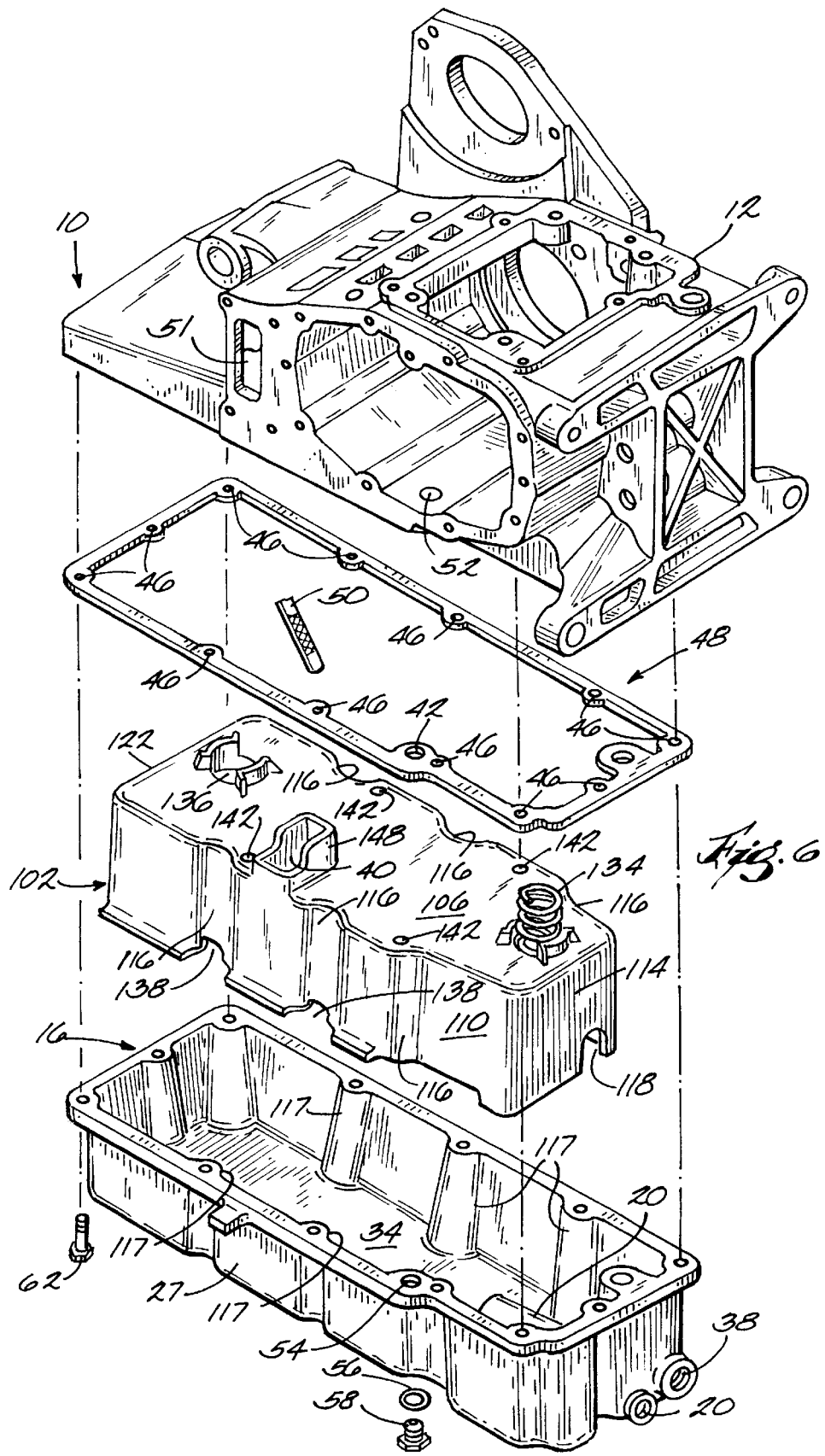

DRY SUMP OIL COOLING SYSTEM

FIELD OF THE INVENTION

The present invention relates to dry sump oil systems for internal combustion engines.

BACKGROUND OF THE INVENTION

Internal combustion engines typically employ either a wet sump or a dry sump lubrication system. Conventional wet sump systems generally include a crankcase, an oil pan defining a sump below the crankcase, and an oil pump. Oil from the crankcase above the oil pan typically flows through a centrally located opening and collects within the pan. The pump is generally centrally located near the bottom of the pan for withdrawing oil from the pan and for supplying the oil to the engine.

During operation of the engine, the oil frequently becomes hot and highly aerated. Because internal combustion engines employing wet sump systems are generally water cooled, the elevated temperature of the oil is of minimal concern. However, the aeration or foaming of the oil affects the oil's performance in lubricating the engine.

In contrast to wet sump systems, dry sump systems may include an oil pan mounted below the transmission case or an exterior oil tank. As a result, oil is usually supplied to the oil pan through an oil return port located at one end of the pan and is usually returned to the engine through a separate oil pickup port located at another location on the oil pan. To prevent premature wear of engine parts, it is desirable to adequately cool the oil before it is returned to the engine through the oil pickup port.

In one type of motorcycle, the oil return port and oil pickup port are located near the same end of the oil pan. In this design, hot oil flowing through the oil return port from the engine can flow directly to the oil pickup port before being adequately cooled within the oil pan. As a result, the internal combustion engine would often not be adequately cooled by the oil supply.

SUMMARY OF THE INVENTION

The present invention provides a dry sump oil cooling and de-aeration system for an internal combustion engine including an oil reservoir, an oil return port, an oil pickup port, and a baffle. The oil reservoir has a first end, a second end, a top, and a bottom. Both the oil return port and the oil pickup port are defined near the first end of the reservoir. The oil return port is located adjacent the top of the reservoir while the oil pickup port is located adjacent the bottom of the reservoir. In a first embodiment, the baffle is coupled to the reservoir between the top and the bottom to divide the reservoir into a top chamber and a bottom chamber. The baffle defines an oil passageway between the top chamber and the bottom chamber at the second end such that oil must flow substantially across the length of the oil pan reservoir twice (e.g., at least about 150% of the length of the reservoir) before being returned to the engine through the oil pickup port.

In another embodiment, the baffle is adapted to rest on the bottom of the reservoir. In this embodiment, the baffle includes side walls depending from a top wall to create a cavity therebetween. The side walls have cut-outs to facilitate draining oil from the reservoir during oil changes. The top wall has vent apertures that allow air to be expelled from the cavity while the engine is operating. Depending from the top wall or side walls into the cavity are a plurality of deflector walls that cause oil flowing through the cavity to follow a generally serpentine path, thereby increasing residence time of the oil in the reservoir. The baffle can also include one or more springs that firmly hold the baffle against the bottom of the reservoir.

BRIEF DESCRIPTION OF THE DRAWINGS

FIG. 2 is an exploded perspective view of the dry sump oil cooling system, including a first embodiment of a baffle.

FIG. 3 is a perspective view of a second embodiment of the baffle.

FIG. 4 is a perspective view of a third embodiment of the baffle.

FIG. 5 is a perspective view of a fourth embodiment of the baffle.

FIG. 6 is an exploded perspective view of the dry sump oil cooling system, including a fifth embodiment of the baffle.

DETAILED DESCRIPTION

Figure 1:
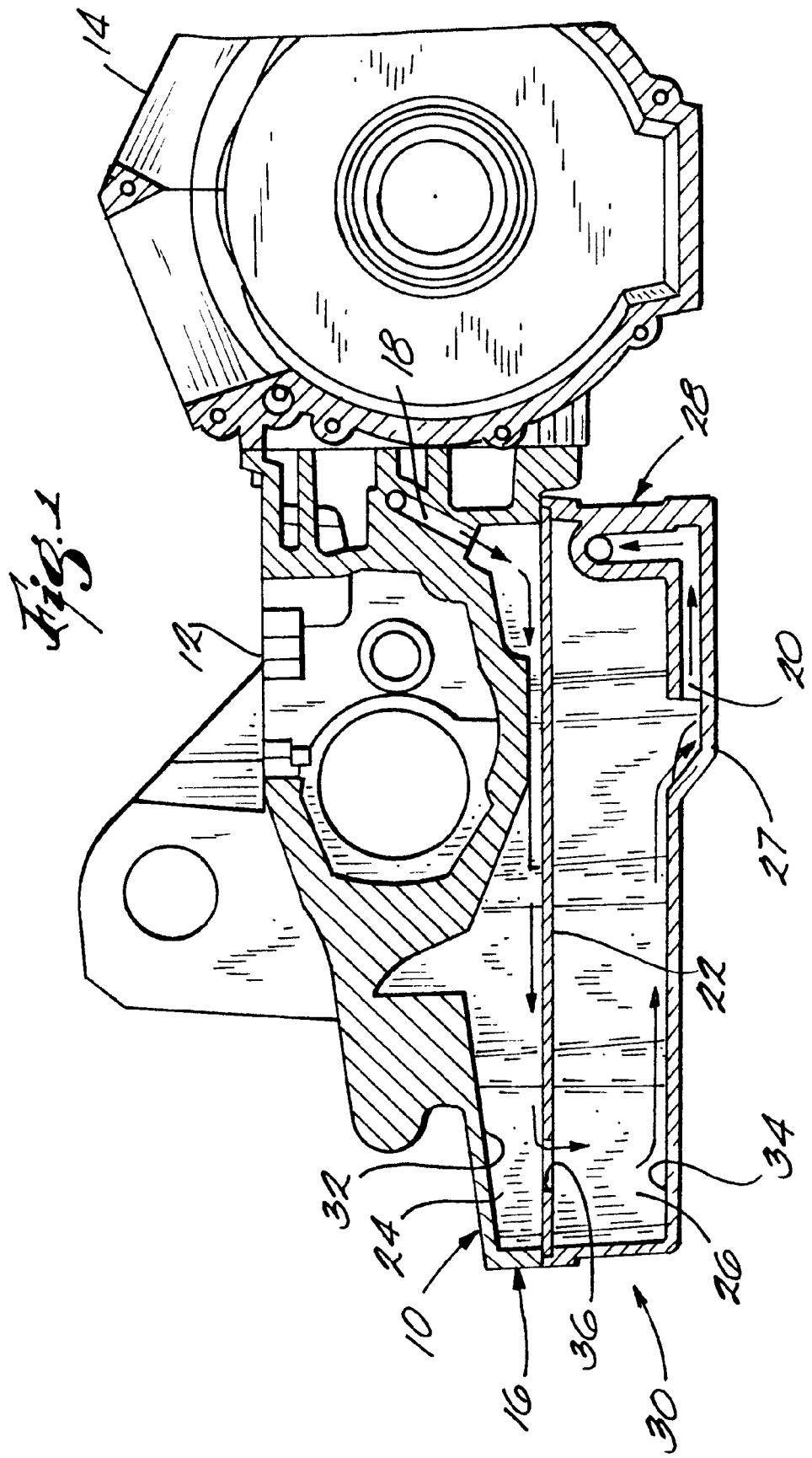
FIG. 1 is a cross-sectional view illustrating a dry sump oil cooling system found below a transmission case for supplying oil to an engine.

FIG. 1 illustrates a dry sump oil cooling system 10 supported below a transmission case 12 for receiving, de-aerating or defoaming, and cooling oil from an engine 14. The term "oil", as used herein, means oil or synthetic lubricating fluid.

The cooling system 10 generally includes an oil reservoir 16, an oil return port 18, an oil pickup port 20, and an oil diverter baffle 22 positioned between the return port 18 and the pickup port 20. FIGS. 1 and 2 illustrate the cooling system 10 incorporating a first embodiment of the baffle 22. The oil reservoir 16 extends below the transmission case 12 and includes a top chamber 24 and a bottom chamber 26. The top chamber 24 extends above the baffle 22 and is preferably integrally formed as part of the transmission case 12. Alternatively, the top chamber 24 may be separately formed and individually mounted below the transmission case 12 or at any suitable location.

The bottom chamber 26 extends below the top chamber 24 and below the baffle 22. In the first embodiment illustrated, the bottom chamber 26 is formed by an oil pan 27 mounted to the transmission case 12. Alternatively, the bottom chamber 26 may be integrally formed as a single unitary body, with either or both of the baffle 22 and the top chamber 24. The top chamber 24 and the bottom chamber 26 together define the oil reservoir 16 having a first end 28 adjacent the engine 14, a second opposite end 30, a top 32, and a bottom 34. For the oil cooling system incorporating the first embodiment of the baffle 22, the top chamber 24 and the bottom chamber 26 are divided by the baffle 22.

The oil return port 18 comprises an opening in fluid communication with both the engine 14 and the top chamber 24 at the first end 28 of the reservoir 16. Hot oil returning from the engine 14 is supplied through the return port 18 to the top chamber 24. The return port 18 is preferably integrally formed within the transmission case 12. As can be appreciated, the oil return port 18 may alternatively comprise any of a variety of oil conduits such as hoses and the like coupled to the top chamber 24 for returning oil from the engine 14 to the reservoir 16.

The baffle 22 includes an oil passageway 36 sized for permitting oil flow from the top chamber 24 to the bottom chamber 26. While the size of the passageway 37 can vary, in the illustrated embodiment, the passageway 36 has a width of about 1 inch and a length of about 4.5 inches. The illustrated passageway 36 is spaced from the first end 28 by about 12.8 inches and is spaced from the second end 30 by about 1 inch, although these dimensions can vary to meet design considerations.

The oil pickup port 20 is an oil conduit defined at the first end 28 of the reservoir 16 within the bottom chamber 26. The pickup port 20 is preferably defined adjacent the bottom 34 of the reservoir 16.

The pickup port 20 withdraws cooled and de-aerated oil from the reservoir 16 for return to the engine 14. An oil drain port 38 is provided at the first end 28 of the reservoir 16 in a suitable position, such as adjacent the pickup port 20.

During operation of the engine 14, the dry sump oil cooling system 10 cools and de-aerates oil supplied through the return port 18. Hot oil from the engine 14 enters the top chamber 24 through the return port 18 at the first end 28 of the reservoir 16. The hot oil then contacts the baffle 22 and flows across substantially the entire length of the reservoir 16 between the first end 28 and the second end 30 before entering the bottom chamber 26 through the passageway 36 located near the second end 30. Once the hot oil enters the bottom chamber 26, the oil once again flows across substantially the entire length of the reservoir 16 from the second end 30 to the first end 28. Because the baffle 22 forces the oil to flow across substantially the entire length of the reservoir 16 before exiting through the oil pickup port 20, the cooling system 10 more effectively cools and de-aerates the oil within the reservoir 16 before being returned to the engine 14.

FIG. 2 is an exploded perspective view illustrating the dry sump oil cooling system 10 in greater detail. As best shown by FIG. 2, the first embodiment of the baffle 22 is a generally elongated, flat, thin plate secured between the transmission case 12 and the oil pan 27 of the reservoir 16. In the illustrated embodiment, the baffle 22 is preferably formed from a thin stamped sheet of aluminum. Alternatively, the baffle 22 may be formed from a variety of lightweight materials to provide a generally imperforate panel for directing oil flow.

As further shown by FIG. 2, the oil passageway 36 comprises an elongate opening extending substantially along the entire width of the baffle 22 at the second end 30 of the reservoir 16. Although the passageway 36 is illustrated as a single elongated opening, the passageway 36 may alternatively comprise a series of smaller openings or apertures. Also, the passageway 36 may be located closer to or farther from the second end 30 than illustrated.

In addition to defining the oil passageway 36, the baffle 22 also includes a dipstick hole 40, a transmission drain port 42, a settling drain port 44, a plurality of mounting bores 46, and top and bottom gaskets 48. The dipstick hole 40 is a cutout extending through the baffle 22 for providing communication with the bottom 34 of the reservoir 16. In the illustrated embodiment, the hole 40 preferably has a width of about 1.2 inches and a length of about 1.75 inches. The dipstick hole 40 permits the use of a conventionally known dipstick 50 (a portion of which is illustrated in FIGS. 2 and 6) for a visual determination of the oil level within the reservoir 16. The dipstick 50 is inserted into the reservoir 16 through an access aperture 51 provided at a suitable location, such as on a side of the transmission 12 case.

The transmission drain port 42 is a bore or cutout extending through the baffle 22. The port 42 is located to be in fluid communication with a pair of drain ports 52, 54 of the transmission case 12 and the oil pan 27, respectively. As seen in FIG. 2, the port 54, enclosed and defined within a wall of the oil pan 27, is closed with an appropriately sized o-ring 56 and a threaded plug 58. Removal of the plug 58 from the port 54 enables transmission oil to be drained from the interior of the transmission case 12 through the ports 52, 42, 54.

The settling drain port 44 is a minute hole preferably extending through the baffle 22 proximate the first end 28. The settling drain port 44 is preferably sized to prevent any substantial volume of oil from flowing through the port 44 during operation of the engine 14. In the illustrated embodiment, the drain port 44 has a diameter of only about 0.25 inches. The drain port 44 is located opposite the oil flow passage 36 to drain oil from the top chamber 24 into the bottom chamber 26 when oil flow across the baffle 22 has been terminated. The drain port 44 prevents oil from settling on the baffle 22 during periods in which the engine 14 (as shown in FIG. 1) and the oil cooling system 10 are not being utilized. This allows the oil to settle in the oil pan 27 so that an accurate indication of oil level can be received using the dipstick 50.

The mounting bores 46 extend through the baffle 22 about the perimeter of the baffle 22. The mounting bores 46 are preferably aligned in communication with corresponding bores about a perimeter of the transmission case 12 and bores about the perimeter of the oil pan 27. The mounting bores 46 are sized for the reception of corresponding mounting fasteners 62, of which only a single fastener 62 is shown in the drawings.

The top and bottom gaskets 48 are conventionally known gaskets and are configured for encircling both the top and bottom perimeters of the baffle 22 and further encircling the mounting bores 46 and the transmission drain port 42. Each gasket 48 includes a sealing bead (not shown) on one side for adding pressure between the mounting fasteners 62. Overall, the gaskets 48, mounting bores 46, and fasteners 62 seal the baffle 22 between the transmission case 12 and the oil pan 27. The gaskets 48 also seal between the transmission case 12 and the oil pan 27 to prevent oil leakage from the reservoir 16. The gaskets 48 are preferably glued to top and bottom surfaces of the plate forming the baffle 22. Alternatively, the baffle 22 may be integrally formed as part of a unitary body with either the transmission case 12 or the oil pan 27. As can be appreciated, the baffle 22 may be sealed and mounted between the transmission case 12 and the oil pan 27 by a variety of alternative mounting structures and sealing means.

FIG. 3 is a perspective view illustrating a second embodiment in the form of a baffle 72. For ease of illustration, those remaining elements of the baffle 72 that are the same as corresponding elements of the baffle 22 are numbered similarly. The baffle 72 is similar to the baffle 22 of FIGS. 1 and 2, except that the baffle 72 includes a recessed ramp portion 74 and a substantially horizontal, recessed portion 76 in lieu of the settling port 44. The ramp portion 74 slopes downwardly from the first end 28 toward the second end 30 and is recessed from a perimeter of the baffle 22 defining the mounting bores 46. The ramp portion 74 terminates at the horizontal recessed portion 76. The horizontal recessed portion 76 is a generally flat, horizontal portion recessed from the perimeter of the baffle 72 so as to define the oil passageway 36. Because of the downward slope or decline from the first end 28 to the passageway 36 at the second end 30, oil upon the baffle 72 flows to the passageway 36 to drain into the bottom chamber 26 (shown in FIGS. 1 and 2) during periods in which the engine and the oil cooling system 10 are not being utilized. As a result, the provision of the settling drain port 44 is no longer required. For ease of illustration, the baffle 72 has been illustrated without the gaskets 48. As can be appreciated, the baffle 72 may additionally include these components as necessary.

FIG. 4 is a perspective view of a third embodiment of the present invention in the form of a baffle 82. For ease of illustration, those elements of the baffle 82 that are the same as corresponding elements of the baffle 72 are numbered similarly. The baffle 82 is similar to the baffle 72 except that the baffle 82 additionally includes a perforated screen 84. The perforated screen 84 preferably comprises a wire mesh mounted to the baffle 82 across the passageway 36. The screen 84 filters oil flowing through the passageway 36. In addition, the screen 84 further assists in de-aerating oil flowing through the passageway 36.

FIG. 5 is a perspective view illustrating a fourth embodiment of the present invention in the form of a baffle 92. For ease of illustration, those elements of the baffle 92 that are the same as corresponding elements of the baffle 72 are numbered similarly. The baffle 92 is similar to the baffle 72 except that the baffle 92 includes perforated screens 94 and 96. The screens 94 and 96 are generally elongate, thin, angled sheets provided with a multitude of perforations 100 for permitting oil flow therethrough. The screens 94, 96 are mounted to the baffle 92 and are spaced apart from one another along the ramp portion 74. The screen 94 is positioned proximate to the first end 28 while the screen 96 is located proximate to the passageway 36. The screens 94, 96 extend vertically upward from the ramp portion 74 to serve as vertical baffles with perforations for filtering oil and reducing the rate of flow of oil from the first end 28 to the second end 30 for improved de-aeration of the oil flowing across the baffle 92. In the illustrated embodiment, each screen 94, 96 includes a pair of upwardly angled panels 98 angled relative to one another so as to have a generally triangular cross-section. The panels 98 extend across the ramp portion 74 generally perpendicular to the direction in which oil flows down the ramp portion 74.

Figure 7:
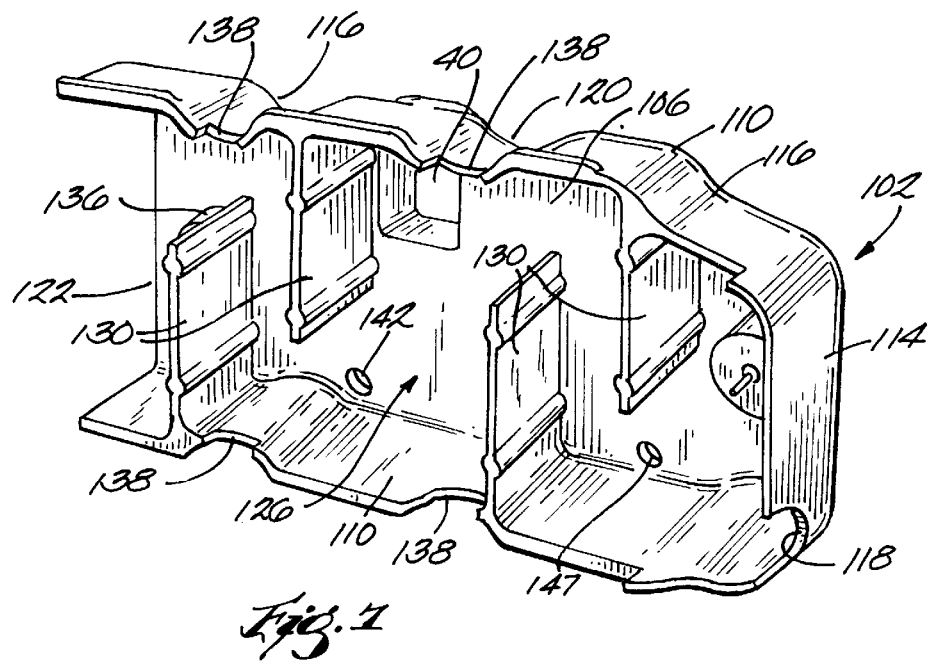
FIG. 7 is a bottom perspective view of the baffle of FIG. 6.
Figure 8:
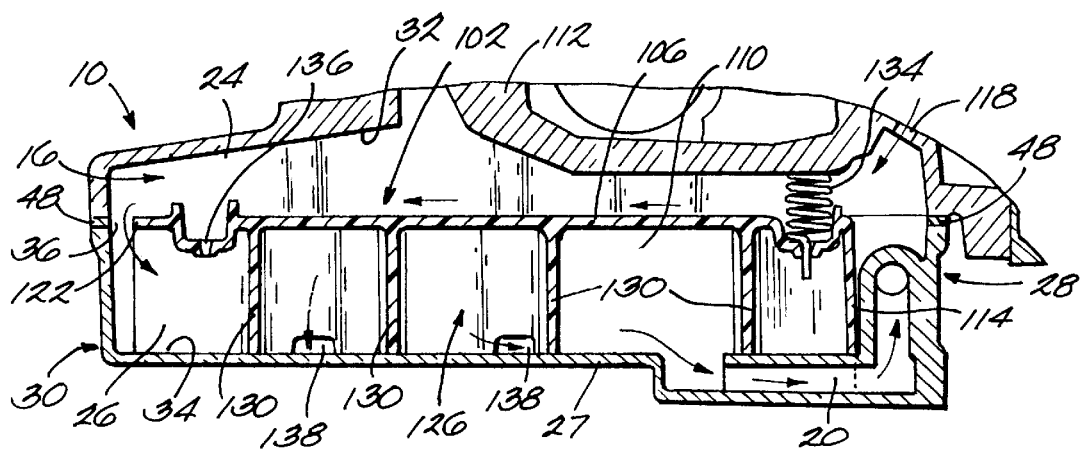
FIG. 8 is a cross sectional view of the oil pan and the baffle according to the fifth embodiment.

FIGS. 6–8 illustrate a baffle 102, which is a fifth embodiment of the present invention. For ease of illustration, those elements illustrated in FIGS. 6–8 that are the same as corresponding elements of those illustrated in FIGS. 1–2 are numbered similarly. In this embodiment, the baffle 102 includes a top wall 106, a pair of side walls 110 depending from the top wall 106, and an end wall 114. The side walls 110 include recesses or scallops 116 that substantially mirror protruding portions 117 of the side walls of the oil pan 27. The end wall 114 defines a pickup port aperture 118 to accommodate the pickup port 20. The baffle 102 also includes an open end 122 that is opposite the end wall 114.

When in its operating position, shown in FIG. 8, the baffle 102 rests on the bottom 34 of the oil pan 27, with the pickup port 20 snugly received within the pickup port aperture 118. A cavity 126 is defined by the top wall 106, the side walls 110, the end wall 114, and the bottom 34 of the oil pan 27. The baffle 102 is smaller than the bottom chamber 26 defined by the oil pan 27. When the baffle 102 is properly positioned within the oil pan 27, spaces are provided between the walls of the oil pan 27 and the side walls 110, end wall 114, and open end 122 of the baffle 102. The space between the open end 122 of the baffle 102 and oil pan wall at the second end 30 of the reservoir 16 defines the passageway 36.

From the above description, it can be seen that the baffle 102 is "free-standing" within the oil pan 27. As used herein, "free-standing" means that the baffle 102 is generally not restricted from sliding, floating, or otherwise moving with respect to the bottom 34 of the oil reservoir 16 in directions generally parallel to the plane of the bottom 34.

During operation of the engine 14, oil flows into the reservoir 16 through the oil return port 18 and into the top chamber 24 defined by the top wall 106 and the top 32 of the reservoir 16. The oil flows over the top wall 106 to the second end 30 of the reservoir 16. The oil then flows through the passageway 36 and into the cavity 126. The oil then flows through the cavity 126 and exits the reservoir 16 through the oil pickup port 20.

A plurality of deflector walls 130 may be provided within the cavity 126 to create a serpentine path within the cavity 126 to increase residence time of oil flowing through the cavity 126, and to enhance the cooling and de-aerating aspects of the oil cooling system 10. The deflector walls 130 preferably depend from the top wall 106 or side walls 110, or both. A single deflector wall 130 or several deflector walls may be used depending on the desired residence time.

A biasing means such as a spring 134 may be positioned between the baffle 102 and the top 32 of the reservoir 16. The biasing means may also be positioned between the oil pan 27 and the side walls 110, between the oil pan 27 and the end wall 114 of the baffle 102, or between any other suitable surfaces. The biasing means may be any means for biasing, such as a leaf spring or a torsional spring. The spring 134 holds the baffle 102 firmly against the bottom 34 or other surface of the reservoir 16, and creates a snug fit between the oil pickup port aperture 118 and the oil pickup port 20. This prevents oil that accumulates in the space between the end wall 114 of the baffle 102 and the oil pan 27 from short-circuiting the desired oil flow path and flowing directly out of the pickup port 20. A second biasing means may be provided and positioned in a recessed portion 136 of the top wall 106 to provide further biasing force on the baffle 102.

Cutouts 138 may be provided in the side walls 110 to facilitate draining the oil from the reservoir through the oil drain port 38 during engine maintenance or oil changes.

Air release holes or vent apertures 142 may be provided in the top wall 106 to allow air pockets within the cavity 126 to be vented to the upper chamber 24. The vent apertures help prevent air from being drawn into the oil pump with the oil.

Some of the oil flowing across the top wall 106 will flow between the side walls 110 and the sides of the oil pan 27 until it reaches the open end 122. The cooling of this oil is enhanced due to the extended contact with the sides of the oil pan 27, which transfers heat to the environment. Some of the oil that flows between the side walls 110 and the sides of the oil pan will also flow through the cutouts 138 and into the cavity 126. Some of the oil may also flow through the vent apertures 142, and into the cavity 126 prior to reaching the second end 30 of the reservoir 16. The quantity of oil flowing through the cutouts 138 and the vent apertures 142 is insignificant, however, and has very little effect on the oil-cooling aspect of the system 10.

In this embodiment, guide walls 148 are provided around the dipstick hole 40. The guide walls 148 facilitate insertion of the dipstick 50 into the cavity 126, and prevent the dipstick 50 from riding along the top of the baffle 102 when inserted. The guide walls 148 also help prevent oil from falling into the cavity 126 through the dipstick hole 40. The guide walls 148 may be provided in the other embodiments as well.

In the embodiment illustrated in FIGS. 6–8, the baffle 102 is independent of the gasket 48 that seals the reservoir 16. Therefore, the transmission drain ports 52, 54 and the mounting bores 46 do not pass through the baffle 102. Additionally, only one gasket 48 is needed with this embodiment of the baffle.

Overall, the dry sump oil cooling system 10 provides an effective dry sump system for de-aerating and cooling the oil that is used to cool the engine 14. Moreover, due to its specific configuration, the dry sump oil cooling system 10 forces oil returning from the engine 14 to flow substantially across the entire length of the oil reservoir 16 twice to prolong the time in which the oil is contained within the reservoir 16 for de-aerating and cooling. Each of baffles 22, 72, 82, 92, and 102 enhances oil de-aeration and cooling without interfering with the function of other components proximate the case 12, such as visual oil inspection or the drainage of transmission oil. The baffles 22, 72, 82, 92 also provide a seal between the transmission case 12 and the separately-mounted oil pan 27, while the baffle 102 allows a separate gasket to be used. As a result, each of baffles 22, 72, 82, 92, and 102 of the dry sump oil cooling system 10 enables a preexisting dry sump system to be easily modified for improved oil de-aerating and cooling and for improved cooling of the engine itself.

Although particular embodiments of the present invention have been shown and described, other alternative embodiments will be apparent to those skilled in the art and are within the intended scope of the present invention. Thus, the present invention is to be limited only by the following claims.

We claim:

1. An oil cooling system for an internal combustion engine, said oil cooling system comprising:
    an oil reservoir having a first end, a second end, a length therebetween, a top and a bottom;
    an oil return port defined substantially at said first end adjacent said top of said reservoir and adapted to allow oil to enter said reservoir;
    an oil pickup port defined substantially at said first end adjacent said bottom of said reservoir and adapted to allow oil to exit said reservoir; and
    a baffle at least partially disposed in said reservoir and at least partially defining an oil passageway such that oil entering said reservoir through said oil return port flows over said baffle in a first direction, and under said baffle in a second direction substantially opposite the first direction, before exiting through said oil pickup port.

2. The oil cooling system of claim 1, wherein said baffle divides said reservoir into a top chamber and a bottom chamber, and wherein at least a portion of said oil passageway extends through said baffle between said top chamber and said bottom chamber.

3. The oil cooling system of claim 2, wherein said baffle includes a perforated screen disposed between said oil return port and said bottom chamber.

4. The oil cooling system of claim 3, wherein said perforated screen extends substantially across a portion of said oil passageway.

5. The oil cooling system of claim 1, wherein said baffle includes a perimeter and a central portion recessed from said perimeter.

6. The oil cooling system of claim 1, wherein said baffle includes a settling drain port.

7. The oil cooling system of claim 1, wherein said baffle includes a top wall, at least one side wall depending from said top wall, and a cavity at least partially defined by said top wall and said at least one side wall.

8. The oil cooling system of claim 7, wherein said at least one side wall includes a cut-out for facilitating drainage of oil from said cavity.

9. The oil cooling system of claim 7, wherein said reservoir includes a reservoir side wall having a plurality of protrusions, and wherein said at least one side wall of said baffle includes a plurality of recesses that receive said protrusions.

10. The oil cooling system of claim 7, further comprising a biasing member for biasing said baffle against a surface of said reservoir.

11. The oil cooling system of claim 7, wherein said baffle includes at least one deflector wall positioned within said cavity for creating a substantially serpentine oil flow path within said cavity.

12. The oil cooling system of claim 7, wherein said baffle is substantially free-standing within said oil reservoir.

13. An oil cooling system for an internal combustion engine, said oil cooling system comprising:
    an oil reservoir having a first end, a second end, a length therebetween, a top and a bottom;
    an oil return port defined substantially at said first end adjacent said top of said reservoir and adapted to allow oil to enter said reservoir;
    an oil pickup port defined substantially at said first end adjacent said bottom of said reservoir and adapted to allow oil to exit said reservoir; and
    a baffle having a top wall, at least one side wall depending from said top wall, and a cavity at least partially defined by said top wall and said at least one side wall, said baffle being at least partially disposed in said reservoir and at least partially defining an oil passageway substantially at said second end such that oil entering said reservoir through said oil return port flows through said oil passageway before exiting through said oil pickup port.

14. The oil cooling system of claim 13, wherein said top wall generally divides said oil reservoir into a top chamber and a bottom chamber, and wherein said oil passageway is defined between said top chamber and said bottom chamber.

15. The oil cooling system of claim 13, further comprising a biasing member for biasing said baffle against said bottom of said reservoir.

16. The oil cooling system of claim 13, wherein said reservoir has a length and said baffle is sized and positioned within said reservoir to cause oil entering said reservoir to travel a distance equal to at least about 150% said length of said reservoir before exiting through said oil pickup port.

17. An oil reservoir baffle comprising:
    a top wall;
    a side wall;
    an end wall; and
    an open end opposite said end wall;
    whereby said baffle is positionable in an oil pan having a length to cause oil entering said oil pan to flow at least said length of said oil pan prior to exiting said oil pan.

18. The baffle of claim 17, further comprising a biasing member connected to said top wall.

19. The baffle of claim 18, wherein said biasing member is a spring.

20. The baffle of claim 17, wherein said side wall defines a plurality of recesses.

21. The baffle of claim 17, wherein said side wall defines at least one cutout on a bottom edge of said side wall.

22. The baffle of claim 17, wherein said end wall defines an aperture sized to receive an oil port.

23. The baffle of claim 17, wherein said top wall includes a dipstick opening.

24. The baffle of claim 23, further comprising a guide wall extending upward from said top wall adjacent said dipstick opening.

* * * * *